United States Patent
Peronnet et al.

(10) Patent No.: US 11,704,112 B2
(45) Date of Patent: Jul. 18, 2023

(54) METHOD AND SYSTEM FOR RECONCILIATION OF A SET OF K8S RESOURCE/OBJECTS

(71) Applicant: OVH, Roubaix (FR)

(72) Inventors: Pierre Peronnet, Croix (FR); Simon Guyennet, Bordeaux (FR)

(73) Assignee: OVH, Roubaix (FR)

( * ) Notice: Subject to any disclaimer, the term of this patent is extended or adjusted under 35 U.S.C. 154(b) by 182 days.

(21) Appl. No.: 17/375,075

(22) Filed: Jul. 14, 2021

(65) Prior Publication Data
US 2022/0326942 A1    Oct. 13, 2022

(30) Foreign Application Priority Data

Apr. 7, 2021    (EP) .................................... 21305448

(51) Int. Cl.
*G06F 8/71*    (2018.01)
(52) U.S. Cl.
CPC ...................................... *G06F 8/71* (2013.01)
(58) Field of Classification Search
CPC ........................................................ G06F 8/71
See application file for complete search history.

(56) References Cited

U.S. PATENT DOCUMENTS

| | | | | |
|---|---|---|---|---|
| 7,822,711 B1 * | 10/2010 | Ranade | ................... | G06F 16/10 707/622 |
| 8,510,304 B1 * | 8/2013 | Briggs | ................... | G06F 16/22 707/742 |
| 9,037,557 B2 * | 5/2015 | Liedes | ................ | G06F 16/2246 707/704 |
| 9,122,556 B2 * | 9/2015 | Mahajan | ................... | G06F 8/41 |
| 9,904,614 B2 * | 2/2018 | Stevens | ................ | G06F 11/3604 |
| 10,983,991 B1 * | 4/2021 | Geeves | ................ | G06F 16/2379 |
| 11,256,497 B1 * | 2/2022 | Dwivedi | ................... | G06F 8/71 |
| 11,334,475 B1 * | 5/2022 | Rabinowitz | ............... | G06F 8/33 |
| 2006/0010153 A1 * | 1/2006 | Bugaj | ..................... | G06T 13/00 707/999.102 |
| 2012/0180024 A1 * | 7/2012 | Gonzalez | .................. | G06F 8/71 717/109 |
| 2017/0351511 A1 * | 12/2017 | Bar-Or | ...................... | G06F 8/34 |
| 2019/0332631 A1 * | 10/2019 | Glaubman | ......... | G06Q 10/0635 |
| 2020/0320130 A1 * | 10/2020 | Korpman | ............ | G06F 16/8373 |

OTHER PUBLICATIONS

Kubernetes, "Production-Grade Container Orchestration", https://kubernetes.io/ accessed Jul. 13, 2021, pdf 6 pages.

* cited by examiner

*Primary Examiner* — Douglas M Slachta
(74) *Attorney, Agent, or Firm* — BCF LLP (57) ABSTRACT

A method and system for reconciliation of a set of K8s resource/objects includes a Graph Dependency (GD) API enabling a Developer to define a dependency graph between K8s resource/objects of the set. Interfacing with the API Server in a K8s system, the GD API monitors events on the K8s resource/objects of the set, and upon occurrence of an event on an affected K8s resource/object, triggers reconciliation of the set as determined necessary based on the matching of versioning level of the affected K8s resource/object, with the versioning level of the parent recorded in children of the affected K8s resource/object, from immediate children to leaf children in the dependency graph.

19 Claims, 8 Drawing Sheets

METHOD AND SYSTEM FOR RECONCILIATION OF A SET OF K8S RESOURCE/OBJECTS

CROSS-REFERENCE

The present application claims priority to European Patent Application No. 21305448.9, entitled "METHOD AND SYSTEM FOR RECONCILIATION OF A SET OF K8s RESOURCE/OBJECTS," filed on Apr. 7, 2021, the entirety of which is incorporated herein by reference.

FIELD

The present technology relates to information technology, more particularly to a method and system for reconciliation of a set of K8s resource/objects.

BACKGROUND

Systems have been developed that purport to reflect an information technology environment through logically-defined objects that a software may use to automate such operations as the deployment, update, or bug fixing of the information technology environment in the hardware world. Such systems have for example been developed for designing and surveying networking environments. Another such system, known as Kubernetes, or K8s, has been developed for automating deployment, scaling, and management of containerized applications, workloads and services, in a cluster of servers. Reference is made to publicly available information about K8s, such as at https://kubernetes.io/.

K8s defines resource/objects as persistent logical entities representing the state of a cluster of servers. This is the desired state of the physical cluster, ie: by creating a resource/object with a given configuration in the K8s logical cluster, a Developer declares what the physical cluster's workload and resources should look like, and the K8s system constantly works to ensure the created resource/object exists and functions with a physical state matching the configuration. The following is an example of a Pod resource/object configuration in K8s:

```
apiVersion: v1
kind: Pod
metadata:
    annotations: cni.projectcalico.org/podIP: 10.2.6.135/32
    name: debug-7f667db647-lpfpg
spec:
    containers:
    - args:
        - bash
      image: postgres
      imagePullPolicy: Always
      name: debug
      resources: { }
      stdin: true
```

Thus, the configuration of a K8s resource/object includes at a minimum the following fields:

Kind (K8s syntax: "kind:" in the example above): the type of resource/object being created;

Metadata (K8s syntax: "metadata:" in the example above): data to uniquely identify the resource/object (ex: name, ID . . . ); two sub-fields in particular may be had in such field such as : Version (incremented upon any change in any of the resource/object fields), and Generation (incremented upon a change in the Specification field). Version and/or Generation may be designated as "versioning level" hereafter; and Specification (K8s syntax: "spec:" in the example above): the desired state of the resource/object as entered by the Developer.

Further, the following additional field may be had upon creation of a resource/object by the Developer:

Status: characterizes in particular the state of readyness of the resource/object.

A K8s Control Plane continually and actively manages every resource/object's actual physical state to match the configuration. A reconciliation K8s function compares the configuration specified in a resource/object by a Developer against the actual cluster state, and then automatically performs operations to make the actual cluster state reflect the configuration specified by the user. Typically, reconciliation is triggered by a controller function in the K8s Control Plane in response to cluster modifications (e.g. creating, updating, deleting K8s resource/objects) or by making changes to systems external to the cluster (e.g. cloudproviders, github, etc). Similar reconciliation functions may be found in other systems that purport to automate deployment of other types of information technology environments.

K8s reconciliation however finds its limits in that K8s does not natively provide the Developer with means to trigger reconciliation on sets of resource/objects grouped together for meeting certain criteria, matching certain characteristics, sharing certain information and/or as grouped together by a Developer for a specific purpose. For example, K8s reconciliation does not allow to properly account for the dependency that may exist between K8s resource/objects. For example, automatic K8s reconciliation in an entire set forming an application where such dependency exists, is not possible. For example, automatic K8s reconciliation in a set forming several applications where such dependency exists, either between applications or between resources/objects in an application, or applications, is not possible.

There is therefore a need for a method and system that allows automatic reconciliation of a set of resource/objects in a system devising resource/objects to reflect an information technology environment, such as for example K8s.

Generally speaking, the present technology aims at providing an Application Programming Interface, API, that enables a developer to create a dependency graph between resource/objects in a set so as to allow automatic reconciliation for the entire set.

The subject matter discussed in the background section should not be assumed to be prior art merely as a result of its mention in the background section. Similarly, a problem mentioned in the background section or associated to the subject matter of the background section should not be assumed to have been previously recognized in the prior art. The subject matter in the background section merely represents different approaches.

SUMMARY

Embodiments of the present technology have been developed based on developers' appreciation of shortcomings associated to the prior art.

Various implementations of the present technology provide a method for reconciliation of a set of K8s resource/objects, comprising:

enabling a Developer to define, using a Graph Dependency Application Programming Interface, a dependency graph comprising nodes associated to the K8s resource/objects in the set; and monitoring the K8s resource/objects in the set for detecting a change in at least one of Metadata, Specification or Status resource/object fields in at least one resource/object among the K8s resource/objects in the set; and upon detecting a change in at least one of Metadata, Specification or Status resource/object field, in an affected K8s resource/object in the set:
  determining the current versioning level in the Metadata field of the affected K8s resource/object, and for each K8s resource/object associated to an immediate child node of the node in the dependency graph associated to the affected K8s resource/object:
  determining in the Metadata field of the K8s resource/object associated to the immediate child node, whether the versioning level indicated for the K8s resource/object associated to its parent node in the dependency graph matches the current versioning level, and if there is no versioning level indicated, or if the indicated versioning level does not match the current versioning level, modifying the Specification field of the K8s resource/object associated to the immediate child node so as to trigger a change among the monitored K8s resource/objects in the set.

In embodiments of the method, at least one resource/object in the set is a non-standard K8s resource/object defined by the Developer.

In embodiments of the method, the set of K8s resource/objects forms an application.

In embodiments of the method, the set of K8s resource/objects forms several applications.

In embodiments of the method, the versioning level is the Version sub-field of Metadata field.

In embodiments of the method, the versioning level is the Generation sub-field of Metadata field.

In embodiments of the method, it further comprises if there is no versioning level indicated in the Metadata field of the K8s resource/object associated to the immediate child node, or if the indicated versioning level does not match the current versioning level, modifying a field other than the Specification field of the K8s resource/object associated to the immediate child node.

In embodiments of the method, it further comprises if there is no versioning level indicated in the Metadata field of the K8s resource/object associated to the immediate child node, or if the indicated versioning level does not match the current versioning level, modifying the Metadata field of the K8s resource/object associated to the immediate child node, so as to record in it the current versioning level.

In embodiments of the method, the determining in the Metadata field of the K8s resource/object associated to the immediate child node, whether the versioning level indicated for the K8s resource/object associated to its parent node in the dependency graph matches the current versioning level, further comprises, if there is no versioning level indicated, or if the indicated versioning level does not match the current versioning level:
  determining whether the change in at least one of Metadata, Specification or Status resource/object field in the affected K8s resource/object requires a reconciliation of the set of K8s resource/objects, and
  modifying the Specification field of the K8s resource/object associated to the immediate child node so as to trigger a change among the monitored K8s resource/objects in the set, only if the change in at least one of Metadata, Specification or Status resource/object field in the affected K8s resource/object requires a reconciliation of the set of K8s resource/objects.

Various implementations of the present technology provide a system for reconciliation of a set of K8s resource/objects, comprising:
  a Graph Dependency Generator configured to, when used by a Developer, define a dependency graph comprising nodes associated to the K8s resource/objects in the set; and
  a Set Monitor configured to monitor the K8s resource/objects in the set for detecting a change in at least one of Metadata, Specification or Status resource/object fields in at least one resource/object among the K8s resource/objects in the set; and
    upon detecting a change in at least one of Metadata, Specification or Status resource/object field, in an affected K8s resource/object in the set:
    determine the current versioning level in the Metadata field of the affected K8s resource/object, and for each K8s resource/object associated to an immediate child node of the node in the dependency graph associated to the affected K8s resource/object:
      determine in the Metadata field of the K8s resource/object associated to the immediate child node, whether the versioning level indicated for the K8s resource/object associated to its parent node in the dependency graph matches the current versioning level, and if there is no versioning level indicated, or if the indicated versioning level does not match the current versioning level, modify the Specification field of the K8s resource/object associated to the immediate child node so as to trigger a change among the monitored K8s resource/objects in the set.

In embodiments of the system, the set of K8s resource/objects forms an application.

In embodiments of the system, the set of K8s resource/objects forms several applications.

In embodiments of the system, the versioning level is the Version sub-field of Metadata field.

In embodiments of the system, the versioning level is the Generation sub-field of Metadata field.

In embodiments of the system, the Set Monitor is further configured to: if there is no versioning level indicated in the Metadata field of the K8s resource/object associated to the immediate child node, or if the indicated versioning level does not match the current versioning level, modify the Metadata field of the K8s resource/object associated to the immediate child node, so as to record in it the current versioning level.

In embodiments of the system, the Set Monitor is further configured to: if there is no versioning level indicated in the Metadata field of the K8s resource/object associated to the immediate child node, or if the indicated versioning level does not match the current versioning level:
  determine whether the change in at least one of Metadata, Specification or Status resource/object field in the affected K8s resource/object requires a reconciliation of the set of K8s resource/objects, and
  modify the Specification field of the K8s resource/object associated to the immediate child node so as to trigger a change among the monitored K8s resource/objects in the set, only if the change in at least one of Metadata, Specification or Status resource/object field in the affected K8s resource/object requires a reconciliation of the set of K8s resource/objects.

Various implementations of the present technology provide a Graph Dependency Application Programming Interface enabling a Developer to define a dependency graph comprising nodes associated to K8s resource/objects in a set, comprising:

a command configured to, when used by the Developer, create and initialize the dependency graph;

a command configured to, when used by the Developer, create in the dependency graph a root node associated to a first K8s resource/object in the set;

a command configured to, when used by the Developer, add in the dependency graph an immediate child node, associated to a second K8s resource/object in the set, of at least one node already created or added be the Developer in the dependency graph; and a command configured to, when used by the Developer when all K8s resource/object in the set have been associated to a node in the dependency graph, start the monitoring of the K8s resource/objects in the set, and upon occurrence of at least one event among the K8s resource/object in the set, trigger K8s reconciliation in the set.

In embodiments of the Graph Dependency Application Programming Interface, the at least one event comprises:

detecting a change in at least one of Metadata, Specification or Status resource/object fields in an affected resource/object among the K8s resource/objects in the set; and determining in the Metadata field of the K8s resource/object associated to an immediate child node of the node associated to the affected K8s resource/object, that either the versioning level indicated for the K8s resource/object associated to its parent node in the dependency graph does not match the current versioning level of the affected K8s resource/object, or there is no versioning level indicated; and the K8s reconciliation in the set comprises modifying the Specification field of the K8s resource/object associated to the immediate child node so as to trigger an event among the monitored K8s resource/objects in the set.

In embodiments of the Graph Dependency Application Programming Interface, it further comprises a command configured to, when used by the Developer when all K8s resource/object in the set have been associated to a node in the dependency graph:

choose one K8s resource/object as affected K8s resource/object among the K8s resource/objects in the set; and force K8s reconciliation for K8s resource/objects associated to all child nodes in the dependency graph of the node associated to the affected K8s resource/object.

Various implementations of the present technology provide a computer-readable medium comprising instructions causing a computing system to perform the provided method.

In the context of the present description, the expression "dependency graph" may refer to a graph of dependencies between K8s resource/objects of a set. In such a dependency graph, two nodes associated to two K8s resource/objects are linked together by a vertex, with the node associated to the K8s resource/object that depends on the other K8s resource/object, being the "parent node" of the two nodes, and the node associated to the other K8s resource/object being the "immediate child node" of the two nodes. Such a dependency graph may have one or several "root nodes" (nodes that are not immediate child nodes of any other node) and one or several "leaf nodes" (nodes that have no immediate child nodes). A node may be an immediate child node of more than one parent node, and a parent node may have more than one immediate child node.

In the context of the present description, unless expressly provided otherwise, a system, may refer, but is not limited to, an "electronic device", an "operation system", a "computing system", a "computer-based system", a "controller unit", a "monitoring device", a "control device" and/or any combination thereof appropriate to the relevant task at hand.

In the context of the present description, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, the expression "processor" in intended to include a single dedicated processor, a single shared processor, or a plurality of individual processors, some of which may be shared. In some aspects of the present technology, the processor may be for example a general purpose processor, such as a central processing unit (CPU), a processor dedicated to a specific purpose, or a processor implemented in a FPGA. Other hardware, conventional and/or custom, may also be included.

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above- mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Further, elements that are identical from one figure to the next share the same reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Figure 1:
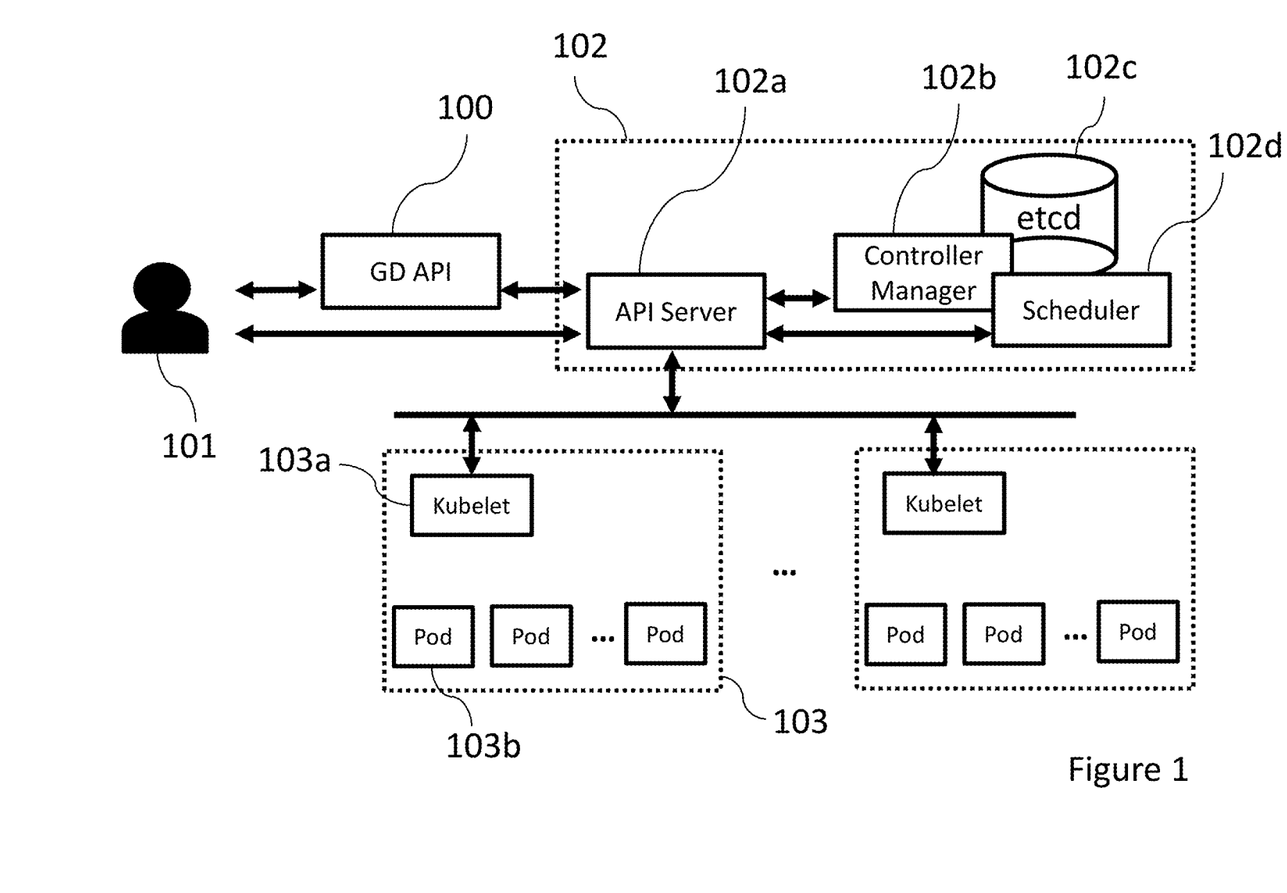
FIG. 1 depicts an environment in which the present technology may be deployed in one embodiment.

With these fundamentals in place, we will now consider some non-limiting examples to illustrate various implementations of aspects of the present technology. FIG. 1 depicts an environment in which the present technology may be deployed in one embodiment. The environment includes a K8s system comprising a Control Plane 102 and one or several Nodes 103. A Node 103 is a machine where application containers (not represented) are deployed. Application containers are organized into Pods 103*b* of the Node 103. Kubelet 103*a* in the Node 103 is responsible for its running state, ensuring that all application containers are healthy. Kubelet 103*a* may start, stop, and maintain application containers, as directed by the Control Plane. Control Plane 102 is the controlling unit of the K8s cluster, managing its workload and directing communication between the various components.

The API Server 102*a* serves a Developer 101 a K8s API, which provides both the internal and external interface to the K8s system. The API Server 102*a* processes and validates REST requests and updates state of the API objects in a database etcd 102*c*. This allows the Developer 101 to configure application containers (not represented) across the Nodes 103. The etcd 102*c* is thus a database that stores configuration data of the K8s cluster, representing at all times its overall state. The API Server 102*a* uses etcd 102*c* to monitor the K8s cluster and roll out critical configuration changes or restore any divergences of the state of the K8s cluster back to what was declared by the Developer 101.

A Controller Manager 102*b* manages controllers (not represented) which in turn manage Pods 103*b*. The Controller Manager 102*b* acts as a reconciliation loop that drives actual K8s cluster state toward the desired cluster state, communicating with the API Server 102*a* to create, update, and delete the resources it manages. A Scheduler 102*d* tracks resource use on each Node 103 to ensure that resource availability matches resource demand.

A Graph Dependency API, or GD API 100 serves according to the present technology the Developer 101 with the capability to build a dependency graph between K8s resource/objects, in a set of K8s resource/objects grouped by, or for, the Developer 101, for example for having certain logical links between them, such as forming one or several applications, and/or otherwise grouped for their meeting certain criteria, matching certain characteristics or sharing certain information, and automate reconciliation of the K8s resource/objects in the set. The K8s resource/objects in the set may be standard K8s resource/objects, and/or "custom" resource/objects as defined by the Developer 101.

Figure 2:
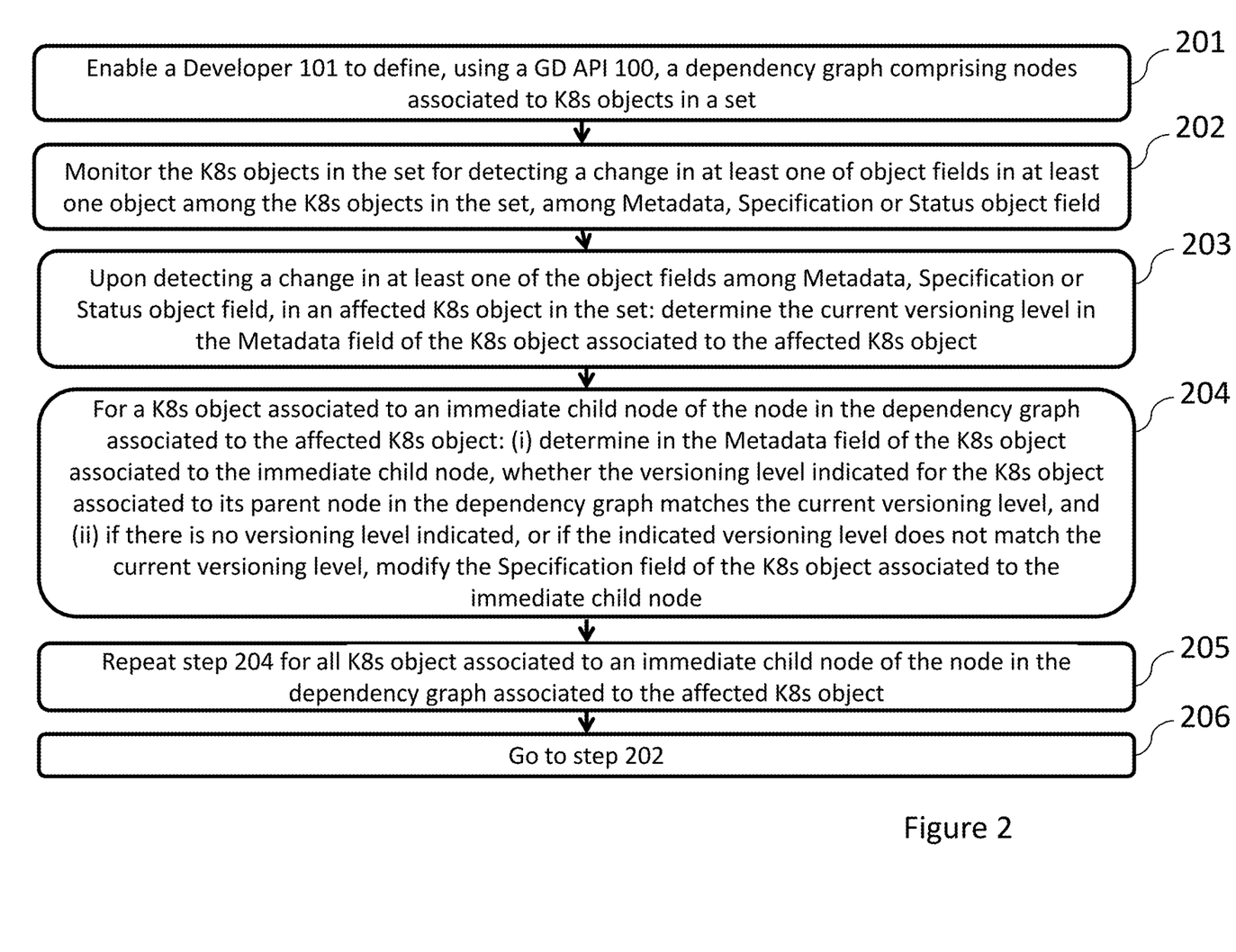
FIG. 2 depicts a method according to certain embodiments of the present technology.

FIG. 2 depicts a method according to certain embodiments of the present technology, of enabling the Developer 101, through the GD API 100, to create a dependency graph for a set of K8s resource/objects, and automate K8s reconciliation for the entire set of K8s resource/objects upon occurrence of certain K8s events with at least one of the K8s resource/objects in the set. At step 201, according to the present technology, the Developer 101 is enabled to define, using the GD API 100, a dependency graph comprising nodes associated to K8s resource/objects in a set. At step 202, a monitoring is started of the K8s resource/objects in the set for detecting a change in at least one of resource/object fields in at least one resource/object among the K8s resource/objects in the set, among Metadata, Specification or Status resource/object field (a "K8s event"). At step 203, if and when a change in at least one of the resource/object fields among Metadata, Specification or Status resource/object field, is detected in one of the K8s resource/objects in the set, as "affected K8s resource/object", then the current versioning level in the Metadata field of the K8s resource/object associated to the affected K8s resource/object is determined. At steps 204 and 205, for all K8s resource/objects associated to an immediate child node of the node in the dependency graph associated to the affected K8s resource/object: firstly is determined in the Metadata field of the K8s resource/object associated to the immediate child node, whether the versioning level indicated for the K8s resource/object associated to its parent node in the dependency graph matches the current versioning level, and second: if there is no versioning level indicated, or if the indicated versioning level does not match the current versioning level, the Specification field of the K8s resource/object associated to the immediate child node is modified. At step 206, the method is repeated from step 202: as any modification made in the Specification field of the K8s resource/object associated to the immediate child node becomes a change monitored at step 202 according to the present technology, the looped process continues until either there are no more modifications made, or the immediate child nodes involved are the leaf nodes in the dependency graph. The versioning level that is being determined may be in relation to the Version sub-field, and/or the Generation sub-field that may be found in the Metadata field of the K8s resource/objects.

Figure 3:
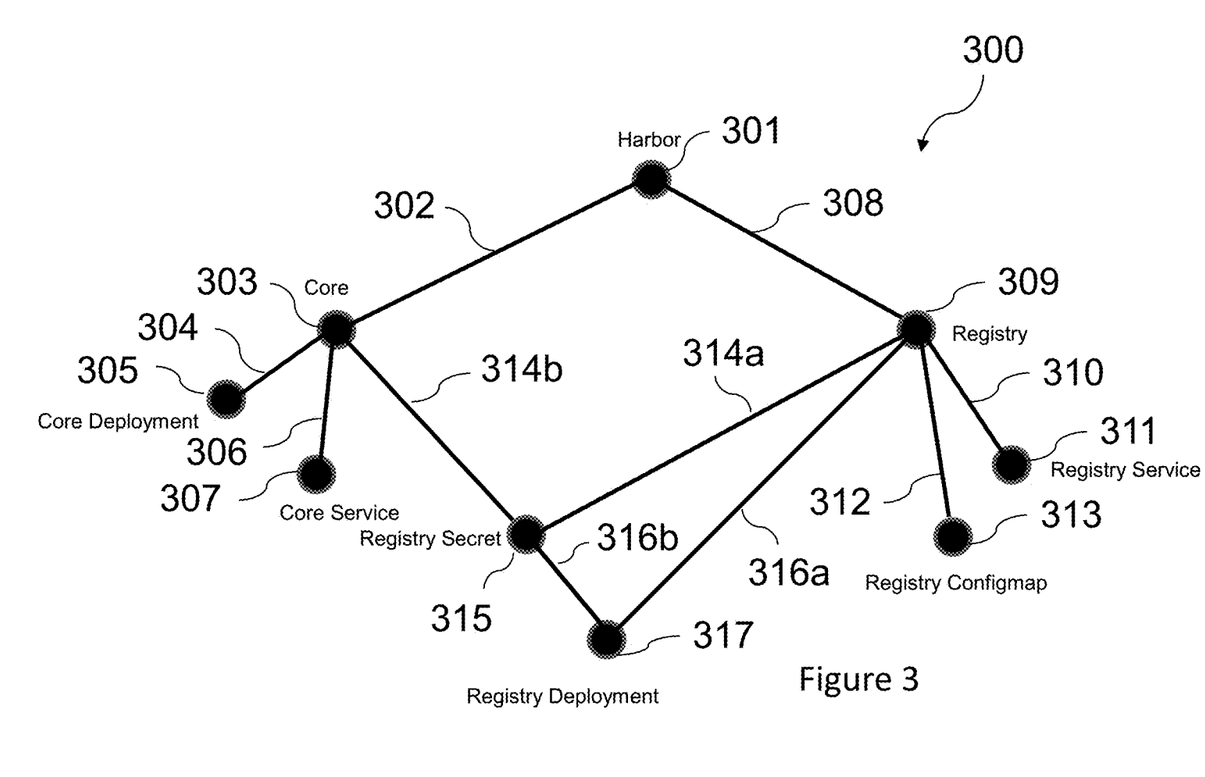
FIG. 3 provides an example of simplified dependency graph built according to the present technology.

FIG. 3 provides an example of simplified dependency graph built according to the present technology, for a set of K8s resource/objects built by the Developer 101 using the GD API 100. The following series of commands in Table 1 may be entered by the Developer 101 to build such a dependency graph, and automatically monitor the K8s resource/objects in the dependency graph for certain changes, and trigger, as the case may be, a K8s reconciliation upon detecting such changes:

TABLE 1

| Command | Action (references to FIG. 3) |
|---|---|
| gd := New( ) | Creates and initializes a new dependency graph entity 300 |
| harborNode := gd.Add(myHarbor) | Creates in dependency graph 300 a root node 301, associated to a resource/object myHarbor |
| coreNode := gd.AddChild(myCore, harborNode) | Creates in dependency graph 300 an immediate child node 303 of node 301, associated to a resource/object myCore, which is a dependency (vertex 302) of resource/object myHarbor |
| coreDeploymentNode := gd.AddChild(myCoreDeployment, coreNode) | Creates in dependency graph 300 an immediate child node 305 of node 303, associated to a resource/object myCoreDeployment, which is a dependency (vertex 304) of resource/object myCore |
| coreServiceNode := gd.AddChild(myCoreService, coreNode) | Creates in dependency graph 300 an immediate child node 307 of node 303, associated to a resource/object myCoreService, which is a dependency (vertex 304) of resource/object myCore |
| registryNode := gd.AddChild(myRegistry, harborNode) | Creates in dependency graph 300 an immediate child node 309 of node 301, associated to a resource/object myRegistry, which is a dependency (vertex 308) of resource/object myHarbor |
| registryServiceNode := gd.AddChild(myRegistryService, registryNode) | Creates in dependency graph 300 an immediate child node 311 of node 309, associated to a resource/object myRegistryService, which is a dependency (vertex 310) of resource/object myRegistry |
| registryConfigMapNode := gd.AddChild(myRegistryConfigMap, registryNode) | Creates in dependency graph 300 an immediate child node 313 of node 309, associated to a resource/object myRegistryConfigMap, which is a dependency (vertex 312) of resource/object myRegistry |
| registrySecretNode := gd.AddChild(myRegistrySecret, registryNode, coreNode) | Creates in dependency graph 300 an immediate child node 315 of nodes 303 and 309, associated to a resource/object myRegistrySecret, which is a dependency (vertex 314b) of resource/object myCore, and a dependency (vertex 314a) of resource/object myRegistry |
| registryDeploymentNode := gd.AddChild(myRegistryDeployment, registrySecretNode, registryNode) | Creates in dependency graph 300 an immediate child node 317 of nodes 315 and 309, associated to a resource/object myRegistryDeployment, which is a dependency (vertex 316b) of resource/object myRegistrySecret, and a dependency (vertex 316a) of resource/object myRegistry |
| gd.Start( ) | Starts the monitoring of the set of resources/objects associated to the dependency graph 300 for certain K8s events, and K8s reconciliation upon occurrence of those K8s events |

In this example, certain resource/objects are standard resource/objects as defined by the K8s system by default: Secret, Configmap, Service, Deployment. Other resource/objects are custom resource/objects defined by the Developer 101, as this capability is permitted by the K8s system, for example here: Harbor, Registry, Core.

It will be appreciated by the person skilled in the art that the construct of GD API 100 and in particular its gd.Add-Child command, inherently prevents the formation of any loops in the dependency graph 300 (as parent nodes may not be added a posteriori).

It will be noted that a further command may be had, not seen in Table 1, such as: gd.Walk( ) that, if entered by the Developer 101 after building the dependency graph 300, allows the Developer to manually choose a node in the dependency graph 300, and force K8s reconciliation for K8s resource/objects associated to all child nodes in the dependency graph of the node associated to the chosen K8s resource/object. If the chosen node is the root node of the dependency graph 300 (node 301), then the whole set of K8s resource/objects associated to all the nodes of the dependency graph 300 may be reconciled.

It will be also appreciated by the person skilled in the art that the set of K8s resources/objects may be viewed as including two applications/micro-services: Core (associated to node 303) and Registry (associated to node 309).

Assuming, as an example, a dependency graph such as dependency graph 300 (FIG. 3) is built, its monitoring is started, including on Version field as versioning level, and a monitored K8s event, such as a change in the resource/object, occurs with the affected resource/object (Registry) associated to node 309, then:

the Version of the resource/object associated to node 309 may be read from its Metadata resource/object field;

immediate child nodes of such node 309 in the dependency graph 300 may be determined, and for each such determined immediate child node 311, 313, 315 or 317: if in the metadata of the resource/object associated to such determined immediate child node, there is either no Version indicated for its parent (309), or there is indicated a Version that does not match the Version of the resource/object associated to node 309 read above, the resource/object associated to the determined immediate child node is modified, including in its Specification field. The modification in the Specification field has as an effect, in the K8s environment, to automatically trigger a reconciliation for the resource/object associated to the determined immediate child node.

It is to be noted:

the system according to the present technology modifies the Specification field, so as to trigger K8s reconciliation, yet in an embodiment, the resource/object associated to the determined immediate child node may additionally be modified in other ways beyond, or in addition to, the Specification field. For example, the system may modify its Metadata field (for example in an "annotation:" field) so as to record in it the current Version of the K8s resource/object of its parent node according to the dependency graph 300;

if in the metadata of the resource/object associated to the determined immediate child node, there is indicated a Version for the parent that matches the Version of the resource/object associated to node 309 read above, then no modification (by either the Developer 101 or the system according to the present technology) may be made to the resource/object associated to the determined immediate child node, and no reconciliation is warranted for the determined immediate child node;

the operations above on immediate child nodes and associated resource/objects may be performed in parallel;

depending on the type of resource/object associated to the determined immediate child node, reconciliation, if and when occurring, may involve are-boot of the resource/object (for example on FIG. 3, resources/objects such as Core Deployment, Registry Deployment); and this is merely an example, and a comparison of the Generation sub-fields in Metadata could be performed in addition to, or in lieu of, a comparison of the Version sub-fields, in a different example and embodiment of the present technology.

The operation above, performed in relation to resources/objects associated to all determined immediate child nodes, may result in at least one of these resources/objects being modified as described above. Since monitoring of the dependency graph 300 has been started and is still active, such a modification becomes a K8s event for a resource/object associated to a node of the dependency graph that continues to be detected.

Thus, assuming that the Specification field of the resource/object associated to node 315 has been modified as a result of the operation above (itself a result of a monitored K8s event occurring with the resource/object associated to node 309), and since child node 317 in the dependency graph 300 is also an immediate child of node 315 (in addition to node 309), then:

the Version of the resource/object associated to node 315 is read from its Metadata resource/object field;

if in the metadata of the resource/object associated to node 317, there is either no Version indicated for its parent (315), or there is indicated a Version that does not match the Version of the resource/object associated to node 315 read above, the resource/object associated to the determined immediate child node is modified, including in its Specification field. A modification in the Specification field has as an effect, in the K8s environment, to automatically trigger a reconciliation for the resource/object associated to the determined immediate child node 317.

Since monitoring of the dependency graph 300 continues to be active, the operation (detecting a change/verifying Version consistency between parent and immediate child/as the case may be modifying the child immediate child, such modification becoming a change that is being monitored) propagates until the leaf nodes in the dependency graph 300, ie: the same processing as described above of all child nodes of an affected resource/object (in this case: Registry) associated to a parent node will occur, until the leaf nodes in the dependency graph are covered.

Figure 4:
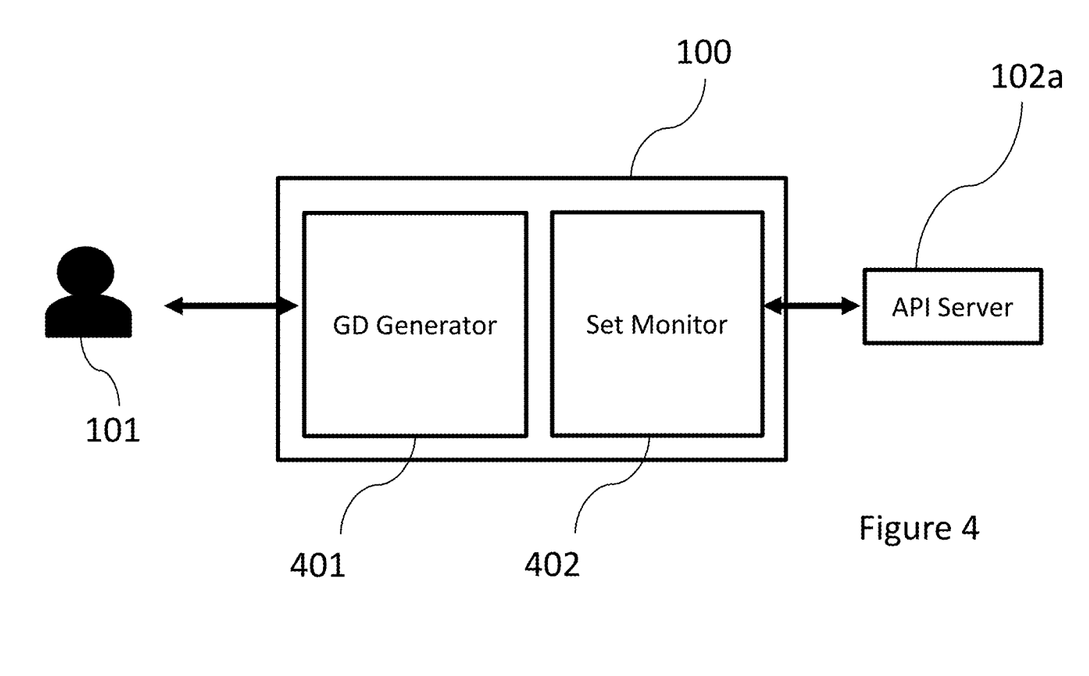
FIG. 4 provides a more detailed view of Graph Dependency API according to the present technology.

FIG. 4 provides a more detailed view of Graph Dependency API 100 according to the present technology. GD API 100 allows to serve the Developer 101 with a number of functions. These functions may be classified in two main categories: a first category related to creating a dependency graph for dependencies of K8s resource/objects in a set, and a second category related to monitoring the set for K8s events affecting K8s resource/objects in the set, and in response, applying modifications to certain of the K8s resource/objects in the set, depending on their relationship with the affected K8s resource/objects, according to the created dependency graph. Thus, as seen FIG. 4, GD API 100 may be viewed as comprising two entities: GD Generator 401 and Set Monitor 402.

GD Generator 401 may interface with, and enable the Developer 101 to define a dependency graph comprising nodes associated to the K8s resource/objects forming a set. It will be apparent to the person skilled in the art, that the graph illustration on FIG. 3 is a simplified illustration of the present technology, and that the GD Generator 401 may enable the Developer 101 to build much more complex graphs for a set of K8s resource/objects. For example, the dependency graph 300 may have two or more root nodes 301. For example, a K8s resource/object may have dependency with more that two other nodes, the syntax gd.Add-Child(node, . . .) allowing to point after "node," to an unlimited number of other dependency nodes.

The Set Monitor 402 may use the dependency graph defined by the Developer 101 through GD Generator 401 for a set of K8s resource/objects, and interface with API Server 102a so as to monitor the K8s resource/objects in the set, and trigger reconciliation of the set of K8s resource/objects upon occurrence of certain K8s events affecting at least one of the K8s resource/objects. Both the GD Generator 401 and the Set Monitor 402 may be written in the GO language, but it will be apparent to the person skilled in the art that other programming languages may be used without affecting the generality of the teachings of the present disclosure.

Figure 5A:
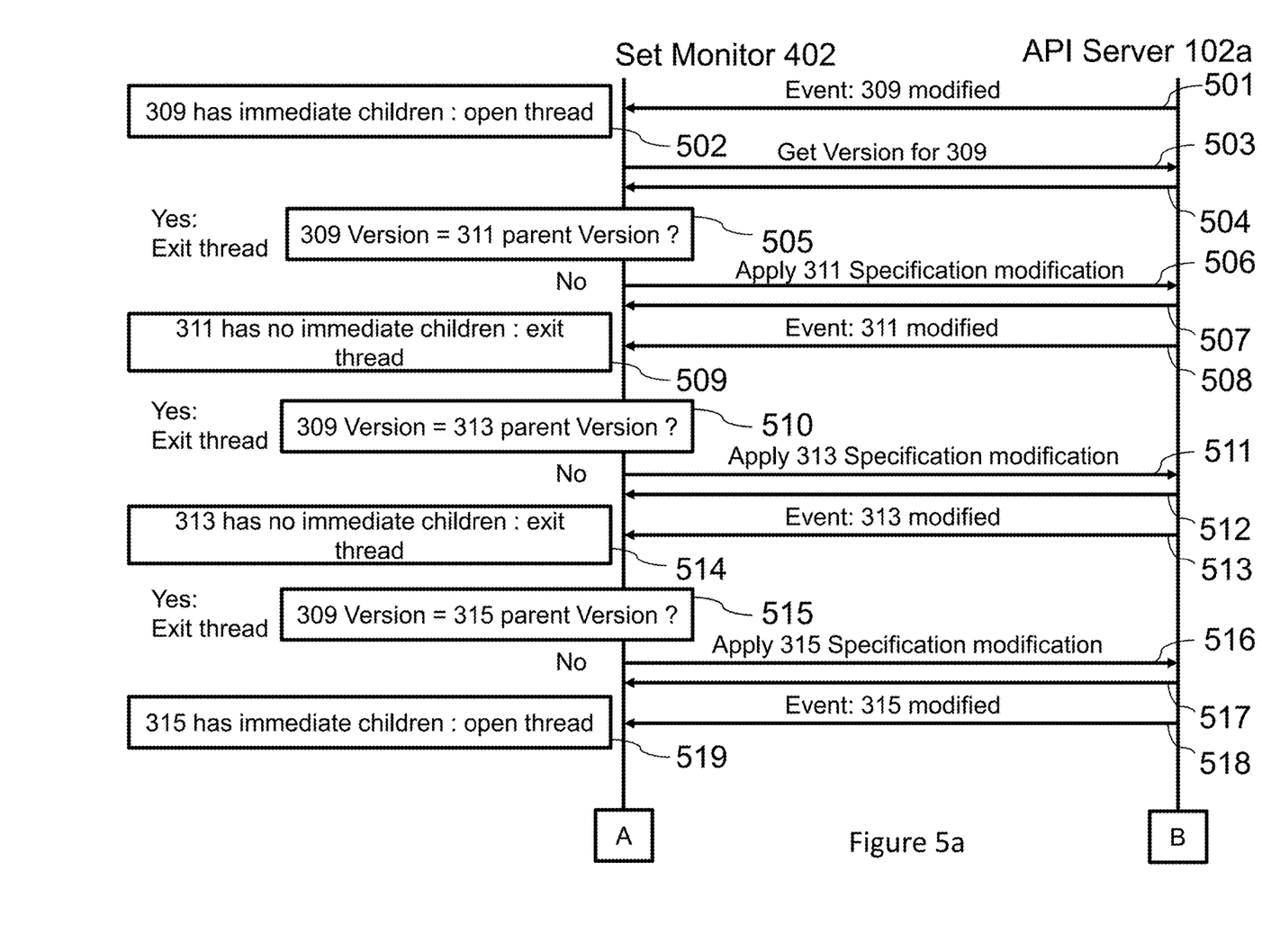
FIGS. 5*a*-5*b* detail processing threads in the aforementioned example of dependency graph, and occurrence of a monitored K8s event affecting one of the resource/objects associated to a node of the dependency graph.
Figure 5B:
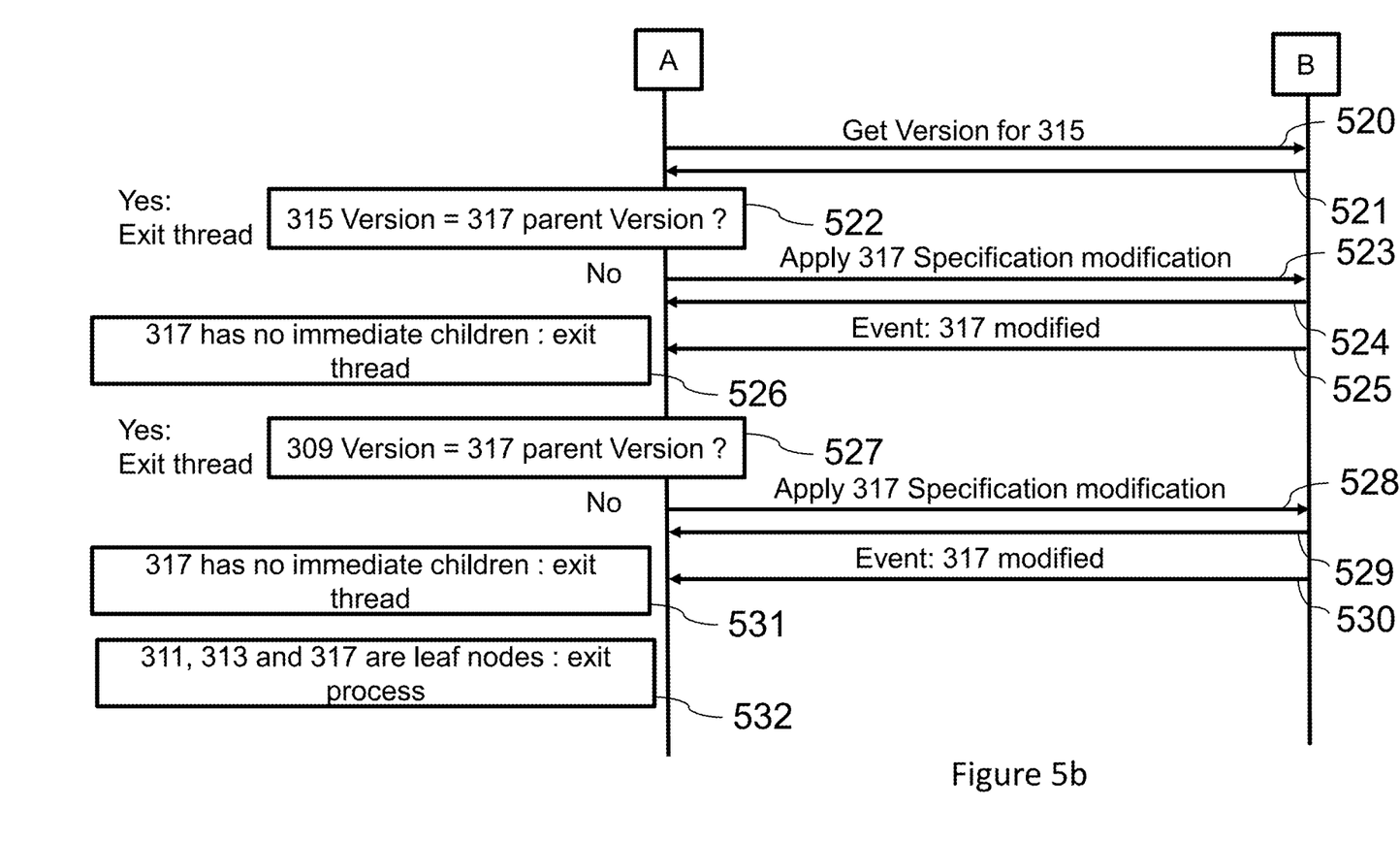

FIGS. 5a-5b detail, at the interface between Set Monitor 402 and API Server 102a, the processing threads of execution in the aforementioned example of the dependency graph 300 (FIG. 3) for a set of K8s resource/objects, monitoring of Version field as versioning level of the K8s resource/objects in the set, and occurrence of a monitored K8s event affecting K8s resource/object Registry associated to node 309.

At step 501, an event notification for a K8s resource/object associated to node 309 may be sent by API Server 102a to Set Monitor 402. As will be appreciated by the person skilled in the art, the representation here, and throughout FIGS. 5a-5b is abbreviated in that the node number in dependency graph 300 only is provided on the figures, when the execution in a step may actually be on the K8s resource/object associated to the node number; for example here, API Server 102a may notify to Set Monitor 402 an event on Registry K8s resource/object, while Set Monitor 402 may determine that Registry K8s resource/object is associated to node 309. In the aforementioned example, the event may be a change in the K8s resource/object Registry. At step 502, Set Monitor 402 may determine, using the dependency graph 300 defined by the Developer 101 through GD Generator 401, that node 309 has 4 immediate children (311, 313, 315, 317), and thus 4 threads may be started.

At steps 503 and 504, Set Monitor 402 may request to, and obtain from, API Server 102a, the current versioning level (its Version in the aforementioned example) of the K8s resource/object associated to node 309.

The thread associated to node 311 may be started: at step 505, Set Monitor 402 may determine in the Metadata field of the K8s resource/object associated to node 311, whether the versioning level indicated for the K8s resource/object associated to node 309 (the parent node) matches the current versioning level obtained at step 504. If there is a match, the thread may be exited. If there is no versioning level indicated, or if the indicated versioning level does not match the current versioning level, at steps 506 and 507, Set Monitor 402 may request to, and obtain from, API Server 102a, the application of a modification on the K8s resource/object associated to node 311, for example a modification of its Specification field. It ensues at step 508 that an event notification for a K8s resource/object associated to node 311 may be sent by API Server 102a to Set Monitor 402. At step 509, Set Monitor 402 may determine that node 311 has no immediate children, and that the thread may be exited.

The thread associated to node 313 may be started: at step 510, Set Monitor 402 may determine in the Metadata field of the K8s resource/object associated to node 313, whether the versioning level indicated for the K8s resource/object associated to node 309 (the parent node) matches the current versioning level obtained at step 504. If there is a match, the thread may be exited. If there is no versioning level indicated, or if the indicated versioning level does not match the current versioning level, at steps 511 and 512, Set Monitor 402 may request to, and obtain from, API Server 102a, the application of a modification on the K8s resource/object associated to node 313, for example a modification of its Specification field. It ensues at step 513 that an event notification for a K8s resource/object associated to node 313 may be sent by API Server 102a to Set Monitor 402. At step 514, Set Monitor 402 may determine that node 313 has no immediate children, and that the thread may be exited.

The thread associated to node 315 may be started: at step 515, Set Monitor 402 may determine in the Metadata field of the K8s resource/object associated to node 315, whether the versioning level indicated for the K8s resource/object associated to node 309 (the parent node) matches the current versioning level obtained at step 504. If there is a match, the thread may be exited. If there is no versioning level indicated, or if the indicated versioning level does not match the current versioning level, at steps 516 and 517, Set Monitor 402 may request to, and obtain from, API Server 102a, the application of a modification on the K8s resource/object associated to node 315, for example a modification of its Specification field. It ensues at step 518 that an event notification for a K8s resource/object associated to node 315 may be sent by API Server 102a to Set Monitor 402. At step 519, Set Monitor 402 may determine that node 315 has immediate children (node 317), and that new threads may be opened.

At steps 520 and 521, Set Monitor 402 may request to, and obtain from, API Server 102a, the current versioning level (its Version in the aforementioned example) of the K8s resource/object associated to node 315.

The thread associated to node 317 (as an immediate child of node 315) may be started: at step 522, Set Monitor 402 may determine in the Metadata field of the K8s resource/object associated to node 317, whether the versioning level indicated for the K8s resource/object associated to node 315 (the parent node) matches the current versioning level obtained at step 521. If there is a match, the thread may be exited. If there is no versioning level indicated, or if the indicated versioning level does not match the current versioning level, at steps 523 and 524, Set Monitor 402 may request to, and obtain from, API Server 102a, the application of a modification on the K8s resource/object associated to node 317, for example a modification of its Specification field. It ensues at step 525 that an event notification for a K8s resource/object associated to node 317 may be sent by API Server 102a to Set Monitor 402. At step 526, Set Monitor 402 may determine that node 317 has no immediate children, and that the thread may be exited.

The thread associated to node 317 (as an immediate child of node 309) may be started: at step 527, Set Monitor 402 may determine in the Metadata field of the K8s resource/object associated to node 317, whether the versioning level indicated for the K8s resource/object associated to node 309 (the parent node) matches the current versioning level obtained at step 504. If there is a match, the thread may be exited. If there is no versioning level indicated, or if the indicated versioning level does not match the current versioning level, at steps 528 and 529, Set Monitor 402 may request to, and obtain from, API Server 102a, the application of a modification on the K8s resource/object associated to node 317, for example a modification of its Specification field. It ensues at step 530 that an event notification for a K8s resource/object associated to node 317 may be sent by API Server 102a to Set Monitor 402. At step 531, Set Monitor 402 may determine that node 317 has no immediate children, and that the thread may be exited.

At step 532, Set Monitor 402 may determine that nodes 311, 313 and 317 are leaf nodes in the dependency graph 300, and that the process may be exited.

Figure 6:
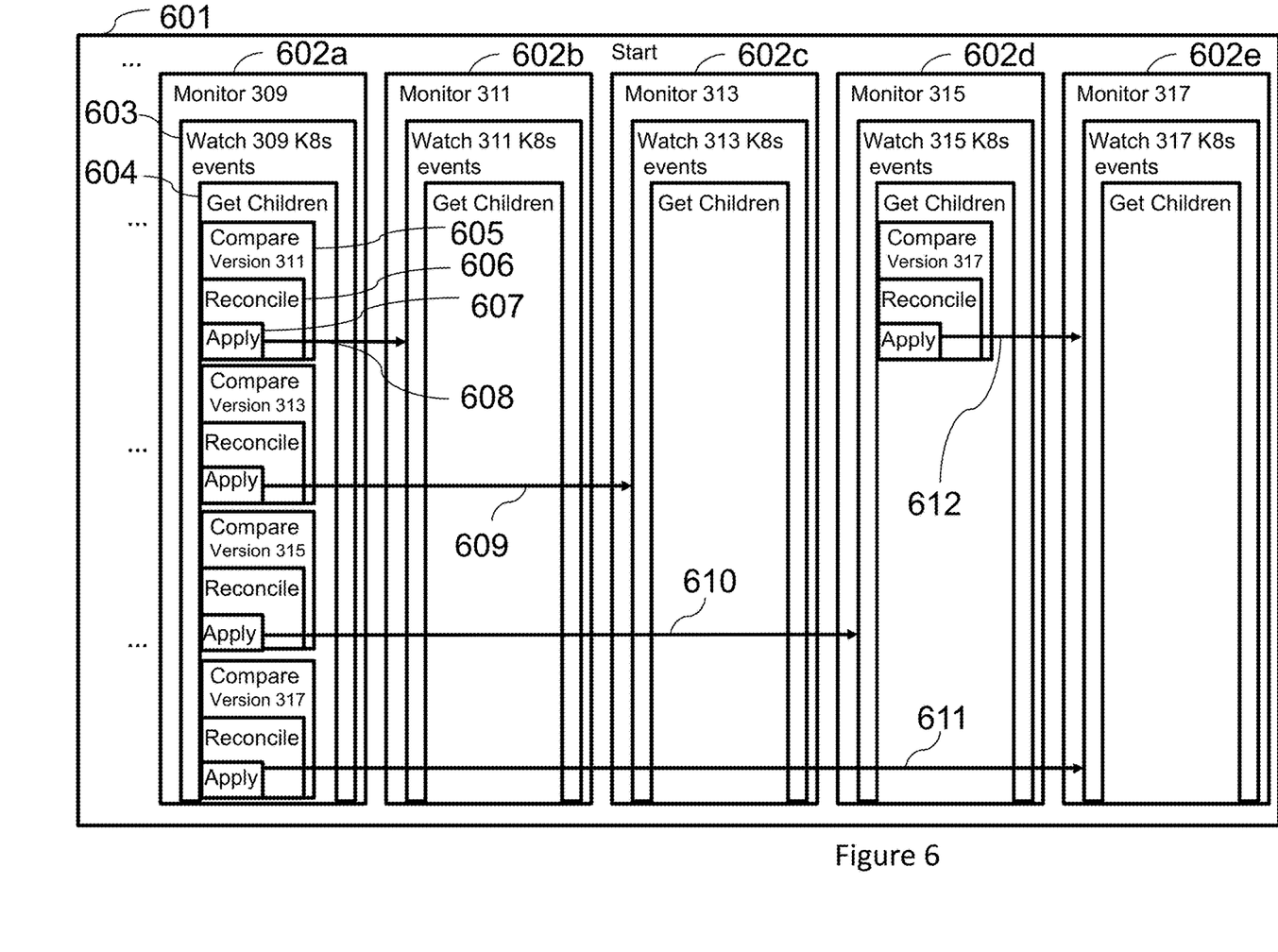
FIG. 6 provides a different representation of the processes involved in the aforementioned example.

FIG. 6 provides a different representation of the processes involved in the aforementioned example. A process "Start" 601 starts the monitoring of the set of resources/objects associated to the dependency graph 300 for certain K8s events, and K8s reconciliation upon occurrence of those events. It includes, among other processes not represented on FIG. 6, processes "Monitor" 602a-e to monitor each one of the individual nodes 309-311-313-315-317 in the dependency graph 300. Within each such process "Monitor", there is a process "Watch" 603 (reference numeral only for process "Monitor" 602a and individual node 309) for events that may affect the corresponding individual node, as notified by API Server 102a. Within each such process "Watch", there is a process "Get Children" 604 (reference numeral only for process "Monitor" 602a and individual node 309) to obtain immediate children of the individual node according to the dependency graph 300. Within each such process "Get Children", there is for each of the immediate children of the individual node, a process "Compare Version" 605 (reference numeral only for process "Monitor" 602a, individual node 309, and immediate child 311) to compare the Version of its parent node recorded in the Metadata of the immediate child node, with the current Version of the individual node. Within each such process "Compare Version", there is a process "Reconcile" 606 (reference numeral only for process "Monitor" 602a, individual node 309, and immediate child 311) to trigger reconciliation of the immediate child. Within each such process "Reconcile", there is a process "Apply" 607 (reference numeral only for process "Monitor" 602a, individual node 309, and immediate child 311) to request of API Server 102a a Specification modification for the immediate child.

When process "Apply" 607 is triggered on immediate child 311 of node 309, it becomes an event 608 that is being watched in the process "Watch" of process "Monitor" 602b on immediate child 311. When process "Apply" is triggered on immediate child 313 of node 309, it becomes an event 609 that is being watched in the process "Watch" of process "Monitor" 602c on immediate child 313. When process "Apply" is triggered on immediate child 315 of node 309, it becomes an event 610 that is being watched in the process "Watch" of process "Monitor" 602d on immediate child 315. When process "Apply" is triggered on immediate child 317 of node 309, it becomes an event 611 that is being watched in the process "Watch" of process "Monitor" 602e on immediate child 317. When process "Apply" is triggered on immediate child 317 of node 315, it becomes an event 612 that is being watched in the process "Watch" of process "Monitor" 602e on immediate child 317.

It is thus apparent that:

actual operations may be performed in parallel where the representation of FIGS. 5a-5b is necessarily sequential; and node 317, as an immediate child node of nodes 309 and 315, may be the object of concurrent events 611 and 612. The processing of such events may be optimized in various embodiments of the present technology, so as to avoid repeated reconciliation(s) on the same associated K8s resource/object. For example, an additional process may be introduced in the process "Watch" so as to either detect a first event/reconciliation having occurred with the K8s resource/node associated to a node, and not repeating another reconciliation upon arrival of a second event for the same K8s resource/node, or, upon arrival of a first event for the K8s resource/node associated to a node, delaying the reconciliation until the arrival of the second event for the same K8s resource/node.

In a further embodiment of the present technology, the K8s reconciliation(s) actually triggered by the process "Start" 601, may be conditioned upon the type of event that affects a K8s resource/node associated to a node. For example, in the process "Watch" 603 (reference numeral only for process "Monitor" 602a and individual node 309) on FIG. 6, an additional process may be introduced (not represented) that may determine whether the event that may affect the corresponding individual node requires a reconciliation of the set of resources/objects associated to the dependency graph 300. If it does require reconciliation, processes "Compare" 605, "Reconcile" 606 and Apply 607 become operational, otherwise not. For example, it may be determined that a change in a Metadata, Specification or Status resource/object field in an affected K8s resource/object does not require a reconciliation of the set of K8s resource/objects associated to the dependency graph 300. For example, it may be determined that a change in a sub-field "Replica" of the Specification field, does not require a reconciliation.

Figure 7:
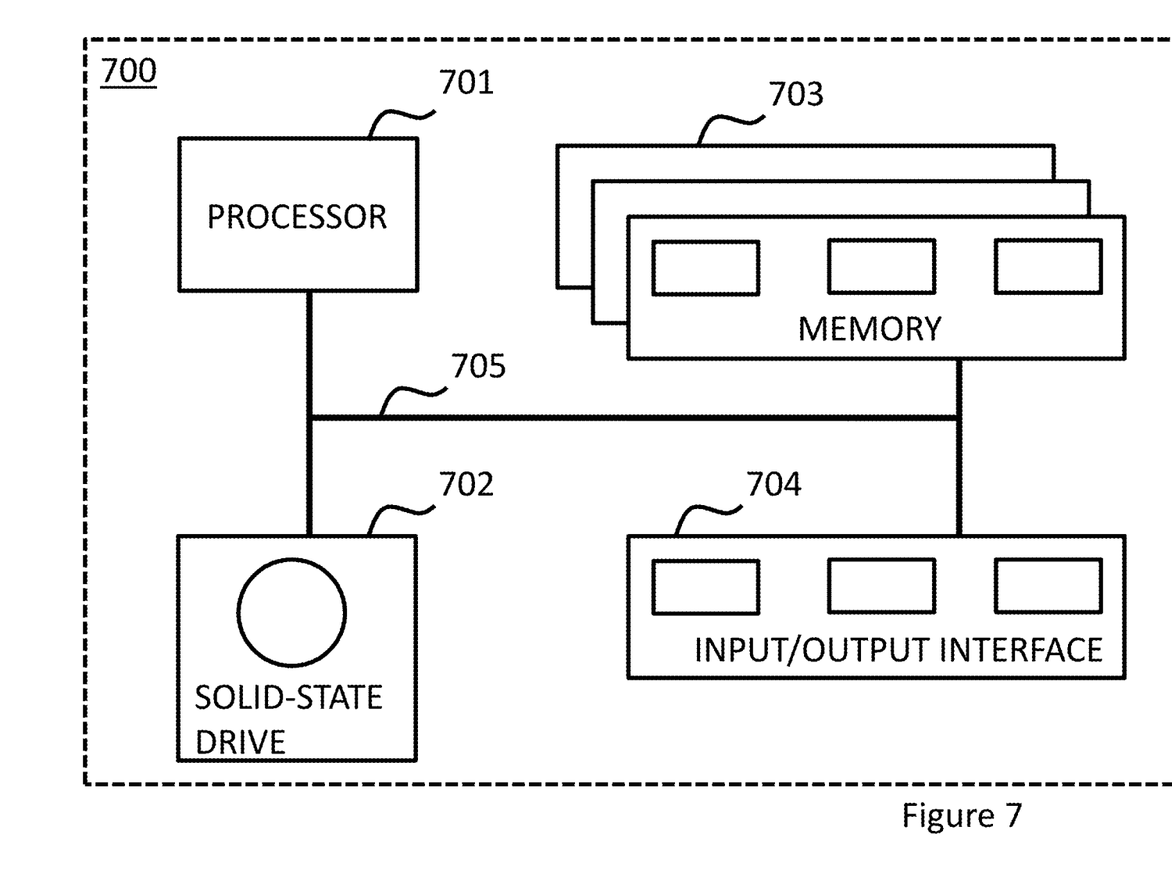
FIG. 7 illustrates a computing system that may be used in the present technology.

FIG. 7 illustrates a computing system that may be used in the present technology. An example of implementation of computing system 700 that may be used for the Control Plane 102 and/or of the GD API 100 is presented. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the Computing System 700 may comprise various hardware components including one or more single or multi-core processors collectively represented by a processor 701, a solid-state drive 702, a memory 703 and an input/output interface 704. In this context, the processor 701 may or may not be included in a FPGA. In some other aspects, the Computing System 700 may be an "off the shelf" generic computing system. In some aspects, the Computing System 700 may also be distributed amongst multiple systems. The Computing System 700 may also be specifically dedicated to the implementation of the present technology. As a person in the art of the present technology may appreciate, multiple variations as to how the Computing System 700 is implemented may be envisioned without departing from the scope of the present technology.

Communication between the various components of the Computing System 700 may be enabled by one or more internal and/or external buses 705 (e.g. a PCI bus, universal serial bus, IEEE 1394 "Firewire" bus, SCSI bus, Serial-ATA bus, ARINC bus, etc.), to which the various hardware components are electronically coupled.

The input/output interface 704 may allow enabling networking capabilities such as wire or wireless access. As an example, the input/output interface 704 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 702 may store program instructions, such as those part of, for example, a library, an application, etc. suitable for being loaded into the memory 703 and executed by the processor 701 for the method and process steps according to the present technology.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for reconciliation of a set of Kubernetes resource/objects, the method comprising:
    enabling a Developer to define, using a Graph Dependency Application Programming Interface, a dependency graph comprising nodes associated to the Kubernetes resource/objects in the set;
    monitoring the Kubernetes resource/objects in the set for detecting a change in at least one of Metadata, Specification or Status resource/object fields in at least one resource/object among the Kubernetes resource/objects in the set; and
    after detecting a change in at least one of the Metadata, Specification or Status resource/object field, in an affected Kubernetes resource/object in the set, determining a current versioning level in the Metadata field of the affected Kubernetes resource/object, and for each Kubernetes resource/object associated to an immediate child node of the node in the dependency graph associated to the affected Kubernetes resource/object:
        determining in the Metadata field of the Kubernetes resource/object associated to the immediate child node, whether the versioning level indicated for the Kubernetes resource/object associated to its parent node in the dependency graph matches the current versioning level, and if there is no versioning level indicated, or if the indicated versioning level does not match the current versioning level, modifying the Specification field of the Kubernetes resource/object associated to the immediate child node so as to trigger a change among the monitored Kubernetes resource/objects in the set.

2. The method of claim 1, wherein at least one Kubernetes resource/object in the set is a non-standard Kubernetes resource/object defined by the Developer.

3. The method of claim 1, wherein the set of Kubernetes resource/objects forms an application.

4. The method of claim 1, wherein the set of Kubernetes resource/objects forms several applications.

5. The method of claim 1, wherein the versioning level is the Version sub-field of the Metadata field.

6. The method of claim 1, wherein the versioning level is the Generation sub-field of the Metadata field.

7. The method of claim 1, further comprising if there is no versioning level indicated in the Metadata field of the Kubernetes resource/object associated to the immediate child node, or if the indicated versioning level does not match the current versioning level, modifying a field other than the Specification field of the Kubernetes resource/object associated to the immediate child node.

8. The method of claim 1, further comprising if there is no versioning level indicated in the Metadata field of the Kubernetes resource/object associated to the immediate child node, or if the indicated versioning level does not match the current versioning level, modifying the Metadata field of the Kubernetes resource/object associated to the immediate child node, so as to record in it the current versioning level.

9. The method of claim 1, wherein the determining in the Metadata field of the Kubernetes resource/object associated to the immediate child node, whether the versioning level indicated for the Kubernetes resource/object associated to its parent node in the dependency graph matches the current versioning level, further comprises, if there is no versioning level indicated, or if the indicated versioning level does not match the current versioning level:
    determining that the change in at least one of Metadata, Specification or Status resource/object field in the affected Kubernetes resource/object requires a reconciliation of the set of Kubernetes resource/objects, and
    modifying the Specification field of the Kubernetes resource/object associated to the immediate child node so as to trigger a change among the monitored Kubernetes resource/objects in the set.

10. A system for reconciliation of a set of Kubernetes resource/objects, the system comprising at least one processor and memory comprising executable instructions which, when executed by the at least one processor, cause the system to:
    define, based on input from a Developer, a dependency graph comprising nodes associated to the Kubernetes resource/objects in the set;
    monitor the Kubernetes resource/objects in the set for detecting a change in at least one of Metadata, Specification or Status resource/object fields in at least one resource/object among the Kubernetes resource/objects in the set; and
    after detecting a change in at least one of the Metadata, Specification or Status resource/object field, in an affected Kubernetes resource/object in the set, determine the current versioning level in the Metadata field of the affected Kubernetes resource/object, and for each Kubernetes resource/object associated to an immediate child node of the node in the dependency graph associated to the affected Kubernetes resource/object:
        determine in the Metadata field of the Kubernetes resource/object associated to the immediate child node, whether the versioning level indicated for the Kubernetes resource/object associated to its parent node in the dependency graph matches the current versioning level, and if there is no versioning level indicated, or if the indicated versioning level does not match the current versioning level, modify the Specification field of the Kubernetes resource/object associated to the immediate child node so as to trigger a change among the monitored Kubernetes resource/objects in the set.

11. The system of claim 10, wherein the set of Kubernetes resource/objects forms an application.

12. The system of claim 10, wherein the set of Kubernetes resource/objects forms several applications.

13. The system of claim 10, wherein the versioning level is the Version sub-field of the Metadata field.

14. The system of claim 10, wherein the versioning level is the Generation sub-field of the Metadata field.

15. The system of claim 10, wherein the instructions further cause the system to: if there is no versioning level indicated in the Metadata field of the Kubernetes resource/object associated to the immediate child node, or if the indicated versioning level does not match the current versioning level, modify the Metadata field of the Kubernetes resource/object associated to the immediate child node, so as to record in it the current versioning level.

16. The system of claim 10, wherein the instructions further cause the system to: if there is no versioning level indicated in the Metadata field of the Kubernetes resource/object associated to the immediate child node, or if the indicated versioning level does not match the current versioning level:
   determine that the change in at least one of Metadata, Specification or Status resource/object field in the affected Kubernetes resource/object requires a reconciliation of the set of Ks Kubernetes resource/objects, and
   modify the Specification field of the Kubernetes resource/object associated to the immediate child node so as to trigger a change among the monitored Kubernetes resource/objects in the set.

17. A non-transitory computer-readable medium comprising computer-readable instructions defining a Graph Dependency Application Programming Interface enabling a Developer to define a dependency graph comprising nodes associated to Kubernetes resource/objects in a set, the Graph Dependency Application Programming Interface comprising:
   a command configured to, when used by the Developer, create and initialize the dependency graph;
   a command configured to, when used by the Developer, create in the dependency graph a root node associated to a first Kubernetes resource/object in the set;
   a command configured to, when used by the Developer, add in the dependency graph an immediate child node, associated to a second Kubernetes resource/object in the set, of at least one node already created or added by the Developer in the dependency graph; and
   a command configured to, when used by the Developer when all Kubernetes resource/objects in the set have been associated to a node in the dependency graph, start the monitoring of the Kubernetes resource/objects in the set, and upon occurrence of at least one event among the Kubernetes resource/objects in the set, trigger Kubernetes reconciliation in the set.

18. The non-transitory computer-readable medium of claim 17, wherein:
   the at least one event comprises:
      detecting a change in at least one of Metadata, Specification or Status resource/object fields in an affected resource/object among the Kubernetes resource/objects in the set; and
      determining in the Metadata field of the Kubernetes resource/object associated to an immediate child node of the node associated to the affected Kubernetes resource/object, that either the versioning level indicated for the Kubernetes resource/object associated to its parent node in the dependency graph does not match the current versioning level of the affected Kubernetes resource/object, or there is no versioning level indicated; and
   the Kubernetes reconciliation in the set comprises modifying the Specification field of the Kubernetes resource/object associated to the immediate child node so as to trigger an event among the monitored Kubernetes resource/objects in the set.

19. The non-transitory computer-readable medium of claim 17, wherein the Dependency Application Programming Interface further comprises a command configured to, when used by the Developer when all Kubernetes resource/objects in the set have been associated to a node in the dependency graph:
   choose one Kubernetes resource/object as the affected Kubernetes resource/object among the Kubernetes resource/objects in the set; and
   force Kubernetes reconciliation for Kubernetes resource/objects associated to all child nodes in the dependency graph of the node associated to the affected Kubernetes resource/object.

* * * * *